United States Patent Office 3,698,983
Patented Oct. 17, 1972

3,698,983
METHOD OF IMPROVING THE ADHESION OF GLASS CLOTH TO RUBBER
Michael I. Bryant, High Point, and Charles E. Jones, Greensboro, N.C., assignors to Burlington Industries, Inc., Greensboro, N.C.
No Drawing. Filed Apr. 16, 1970, Ser. No. 29,302
Int. Cl. C03c 25/02
U.S. Cl. 156—308                              4 Claims

ABSTRACT OF THE DISCLOSURE

A method of improving the bonding properties and other characteristics of a glass textile which comprises treating said textile with a bonding composition which comprises an aqueous mixture of a styrene-butadiene latex, 1-aza-5-alkylol-3, 7-dioxabicyclo[3.3.0]octane and a partially reacted resorcinol-formaldehyde prepolymer which is deficient in formaldehyde, drying and curing the thus treated textile.

---

The present invention is concerned with a novel composition for application to glass textiles, e.g. fibers, yarns and fabrics, in order to improve their flexibility and resistance to internal abrasion and bonding to rubbers. The invention is of particular use in connection with the treatment of glass textiles for use in tires, e.g. as tire cord, although other areas of use are also contemplated where improved abrasion resistance and bonding properties are desired.

Glass textiles have had limited use in tire fabrication and in other areas because of their high loss of tensile strength on flexing, generally low resistance to damage when abraded and the lack of convenient means for effecting a high bond to natural and synthetic rubbers. One difficulty encountered in bonding, for example, is that compositions applied to the textile for bonding purposes (referred to as "tie coats") usually require rather carefully controlled makeup conditions and these compositions generally have a very short shelf-life. Glass textiles treated with such compositions also have a relatively short shelf-life and consequently need to be used fairly promptly after preparation.

The principal object of the present invention is to provide certain novel tie coat compositions for application to glass textiles which will substantially improve the flexibility of the glass, effectively protect the fibers from internal abrasion and also substantially improve the degree of bonding obtained between the textile and conventional tire rubbers. Other objects include the provisions of a tie coat composition which is relatively easy to prepare, has a substantially longer shelf-life and gives a treated glass textile of improved shelf-life. Still further objects and advantages of the invention will be hereafter apparent.

Broadly stated, the objects and advantages of the invention are realized by the provision of an aqueous composition which comprises a synthetic rubber latex, a methylene donor as defined below and a partially reacted resorcinol-formaldehyde resin (referred to herein as "RF" for convenience). While the proportions of these components can be widely varied, they are usually employed in the following weight percentages (dry basis):

|                  | Percent |
|------------------|---------|
| Latex solids     | 10–90   |
| Methylene donor  | 1–6     |
| RF               | 5–20    |
|                  | 100     |

The latex should be a styrene-butadiene latex and preferably at least a portion thereof (i.e. at least 10% up to 100% of the latex solids) is a styrene-butadiene-vinylpyridine terpolymer. A vinylpyridine-butadiene-styrene latex suitable for use herein is available as "Gentac" (General Tire). Other equivalent terpolymers for use herein are available as Good-Rite 2518 (Goodrich), Pyratex B (Naugatuck), and Pliolite VP–100 (Goodyear). These terpolymers may comprise, in parts by weight, from 50 to 95 parts butadiene, 5 to 50 parts vinylpyridine and, per 100 parts of butadiene/vinylpyridine, from 5 to 30 parts styrene. Typically suitable terpolymers, for use herein are also described in Mighton 2,561,215; Cislak et al. 2,402,020; and Wilson 2,652,353.

A styrene-butadiene copolymer latex may be used with the terpolymer latex. An example of such copolymer is one made up of a monomer ratio of from 50/50 to 70/30 parts of butadiene to styrene.

The methylene donor should be a 1-aza-3, 7-dioxabicyclo[3.3.0]octane of the formula

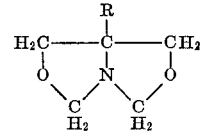

where R is an alkylol radical, preferably methylol. Suitable methods of preparing such compounds are shown in U.S. Pats. 3,266,970 and 3,281,311. The product "M–3," available from Uniroyal, is a particularly suitable methylene donor for use herein. This product is available in solid form (131° F. melting point) and is characterized by the fact that it is activated at temperatures around 248–257° F. (120–125° C.). Chemically, "M–3" is 1-aza-5-methylol-3,7-dioxabicyclo[3.3.0]octane.

Partially reacted resorcinol-formaldehyde resins or prepolymers in aqueous solution or in water-soluble solid form are commercially available and any such prepolymers may be used herein. Particularly preferred is the resorcinol-formaldehyde prepolymer which is available in solid flake form under the name SRF–1500 (Schenectady Chemicals). This prepolymer is somewhat deficient in formaldehyde and therefore can be further reacted with formaldehyde, the molar ratio of resorcinol to formaldehyde being about 1:1. Advantageously the prepolymer is dissolved in water containing a small amount of base, e.g. ammonium or sodium hydroxide, before mixing with the other components. Another resorcinol-formaldehyde condensation product, which can be further reacted with formaldehyde and is useful herein is available as "Penacolite Resin R–2170" (Koppers Company).

The composition of the invention may be prepared as follows:

Two aqueous solutions are first made up, one containing the methylene donor and the other the resorcinol-formaldehyde prepolymer. Typically, the first solution may contain, on a weight basis, 1–20%, preferably about 6% of the methylene donor, balance water, while the other solution contains 4–20%, e.g. about 6% of the resorcinol-formaldehyde prepolymer, 0.5–1.5% ammonium and/or sodium hydroxide or equivalent base, balance water.

The two solutions are then mixed with the latex and allowed to stand, advantageously for a few hours, e.g. 5–6 hours. The resulting composition is then ready for application to the glass textile.

Glass textiles can be treated with the compositions of the invention in any convenient fashion, e.g. by dipping, padding, spraying or the like. Thereafter the textile is dried, usually by heating at 150–325° F. for a period of about 5–10 to 1–1.5 minutes, depending on the temperature employed. Drying at 160° F. for 5 minutes or at 200–300° F. for 1–2.5 minutes is preferred, although optimum conditions will vary depending on the nature of the glass textile and other factors.

After drying, the textile is cured, e.g. by heating at 300–500° F. for 3–1.5 minutes. A curing temperature of about 420–425° F. for 2–2.5 minutes is generally preferred.

Dry solids add-on as a result of the present treatment can be varied over a fairly wide range. However, a pick-up of 10–25% (dry solids) based on the original weight of the textile is usually observed with 15–20% generally preferred.

It will be appreciated that the present tie coat composition is different in several respects from the more conventional types of resorcinol-formaldehyde tie-coats. In the preparation of a typical tire cord dip, as conventionally used, an aqueous resorcinol-formaldehyde precondensate solution is first prepared by mixing together resorcinol, formaldehyde sodium hydroxide and water. The resulting solution is carefully aged for six hours or so with stirring and maintenance of the temperature at 75°±2° F. This resorcinol-formaldehyde solution is then mixed with latex (vinylpyridine terpolymer latex and/or styrene-butadiene copolymer latex) to give the final treating bath.

As will be appreciated, the present treating bath is distinguished from the typical prior composition described above in the use of the indicated methylene donor and in the use of a resorcinol-formaldehyde prepolymer which is deficient in formaldehyde. Preparation of the present bath requires much less control of the make-up conditions and also offers the further advantages indicated herein, i.e. longer shelf-life, treated textile with a longer shelf-life, better bonding to tire rubber and greater flexibility and resistance to internal abrasion.

The invention herein is useful with respect to glass textiles comprising any of the conventional types of glass, e.g. types H, G, DE, E and beta. It will be recognized that the specific results obtainable with the invention will depend to some extent on the specific construction of the fabric or other glass textile, e.g. yarn, roving, etc., being treated. However, the improvements referred to herein are broadly applicable to all types and constructions of glass textiles, e.g. plain or twill weaves, and the like. These glass textiles may be sized, unsized, or cleaned by any conventional desizing procedure.

The rubbers bonded to glass textiles treated in the manner described herein may be any of those known in the art. This includes, for example, conventionally compounded sheets and coatings of natural rubber or such known synthetic rubbers or elastomers as neoprene, butyl, nitriles (Buna N), styrene-butadiene (SBR), acrylonitrile-butadiene-styrene (ABS) and the like.

The invention is illustrated by the following example, the glass fabric used therein being constructed with ECG 75's 1/3 2.0 x 1.5 glass yarns in a plain weave with 16 ends and 2 picks per inch.

(a) A solution was prepared by dissolving 6.15 parts of 1-aza-5-methylol-3,7-dioxabicyclo[3.3.0]octane (M–3) in 93.85 parts of water.

(b) A solution was also prepared by dissolving 6.15 parts resorcinol-formaldehyde prepolymer (SRF–1500) in 92.85 parts of water containing 1.00 parts of $NH_4OH$.

Solutions (a) and (b) were then mixed together with styrene-butadiene-vinylpyridine terpolymer latex and styrene-butadiene latex to give a final composition of the following make-up in parts by weight:

Terpolymer latex (41% solids) _____ 25
Styrene-butadiene latex (50% solids) _____ 25
Solution (a) _____ 17
Solution (b) _____ 33
                                               ———
                                               100

This composition was aged at room temperature (25° C.) for 5–6 hours.

The resulting composition (referred to as Composition A below) was then compared with a prior art composition (Composition B below) prepared in the manner mentioned earlier herein and having the following composition:

Percent
Styrene - butadiene - vinylpyridine terpolymer latex (41%) _____ 25
Styrene-butadiene latex (50%) _____ 25
Resorcinol-formaldehyde solution (6.2%) _____ 50
                                                  ———
                                                  100

For comparison purposes, two pairs of identical glass fabric suitable for use as tire cord and having the construction referred to above, were impregnated, one with each bath, dried at 160° F. for 5 minutes and cured at 400° F. for 2.5 minutes. The two fabric samples were then subjected to the following tests.

Adhesion.—Adhesion was tested by the conventional strip or peel adhesion test. In this test two pieces of the fabric to be tested were cut out, 5" in warp direction and 3" in the fill. Uncured rubber stock in sheet form, about 50–60 mils thick was cut out in the dimensions 2" x 3". A laminate was made by placing the rubber between the two pieces of fabric.

This laminate was then pressed at 300° F. for 30 minutes at 100 p.s.i. From this laminate a strip 1" wide was cut out. The force required to pull the two pieces of fabric apart was then measured on a Scott Tester at a speed of 2 in./min.

Flexibility.—Flexibility was tested on a Tinius-Olsen M.I.T. Fold Endurance Tester. A number .03 head was used with a 1 lb. weight. In this test single warp yarns were tested and the average value obtained was the number of folding cycles the warp yarn withstood before breaking.

Tensile strength.—Single warp yarns 11" long was cut out of each fabric for this test. Three inches of each end of these yarns were embedded between two pieces of rubber cut 3" x 1". This assembly was then laid flat in a press and pressed for 5 minutes at 340° F. with a pressure of 500 p.s.i. on the rubber. The two ends of the assembly were then placed in the jaws of an Instron and the tensile strength of the yarns were checked with the jaw separation being 12 in./min.

Impregnation.—The impregnation of the finish into the yarn bundle was checked by taking cross-sectional pictures with color film and magnification of 75×. The pictures were examined for white or light spots which indicate there is no impregnation by the finish.

The results of these tests are tabulated below:

| Composition | Adhesion | Tensile | MITS | Impregnation |
|---|---|---|---|---|
| B | 65 | 64 | 319 | Good. |
| A | 75 | 64 | 1,250 | Excellent. |

As will be evident, the present composition (A) gave better adhesion, flexibility and impregnation than the prior art product (B).

The shelf-life of the two treating baths was also compared by checking adhesions obtained at various time intervals after preparation of the bath (i.e. at make-up) with the following results:

| Composition | At make-up | 3 hours | 6 hours | 8 hours | 24 hours | 7 days | 14 days |
|---|---|---|---|---|---|---|---|
| B | 65 | 60 | 52 | 30 | 25 | | |
| A | 75 | 80 | 80 | 75 | 80 | 75 | 65 |

It is to be noted that the adhesions obtained with the present composition (A) remained at a high level even though the bath was allowed to stand for two weeks, the adhesion obtained after that time being equal to the best adhesion obtained with bath (B) immediately after preparation. In contrast, the adhesions with composition (B) fell significantly to the point where there was no measurable adhesion after seven days standing. The present finish thus demonstrates a longer and more stable life.

Comparison of the properties of the fabrics obtained with compositions (A) and (B), after storage of the treated fabrics, showed that fabric treated with composition (A) demonstrated better shelf-life. Thus, little or no change in, for example, adhesion, flexibility and other properties was noted in fabric treated according to the invention even after standing for relatively long periods of time whereas the properties of the fabric treated with composition (B) tended to deteriorate on standing.

The scope of the invention is defined in the following claims wherein:

We claim:

1. A method of improving the bonding properties and other characteristics of a glass textile which comprises treating said textile with a bonding composition which comprises an aqueous mixture of a styrene-butadiene polymer latex, 1-aza-5-alkylol-3,7-dioxabicyclo [3.3.0] octane and a partially reacted resorcinol-formaldehyde propolymer which is deficient in formaldehyde, drying and curing the thus treated textile.

2. The method of claim 1 wherein the latex comprises a styrene-butadiene-vinylpyridine terpolymer and the 1-aza - 5 - alkylol - 3,7 - dioxabicyclo [3.3.0] octane is 1-aza-5-methylol-3,7-dioxabicyclo [3.3.0] octane.

3. The method of claim 2 wherein the composition contains the following amounts of said ingredients on a dry basis:

| | Percent |
|---|---|
| Latex solids | 10–90 |
| 1-aza-5-alkylol-3,7-dioxabicyclo [3.3.0] octane | 1–6 |
| Resorcinol-formaldehyde prepolymer | 5–20 |
| | 100 |

4. The method of bonding a glass textile to tire rubber which comprises bringing together the glass textile obtained by the method of claim 1 and the tire rubber under heat and pressure.

References Cited

UNITED STATES PATENTS

| 3,266,970 | 8/1966 | Paul | 260—839 |
| 3,367,793 | 2/1968 | Atwell | 117—126 GB |
| 3,437,610 | 4/1969 | Moult | 117—126 GB |

WILLIAM D. MARTIN, Primary Examiner

D. COHEN, Assistant Examiner

U.S. Cl. X.R.

117—76 T, 126 GB; 260—839